(12) United States Patent
Janssen et al.

(10) Patent No.: US 9,567,434 B2
(45) Date of Patent: Feb. 14, 2017

(54) PROCESS FOR PREPARING PA-4X, AND PA-410 OBTAINABLE BY THE PROCESS

(75) Inventors: Pim Gerard Anton Janssen, Echt (NL); Ronald Ligthart, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 109 days.

(21) Appl. No.: 13/696,336

(22) PCT Filed: May 5, 2011

(86) PCT No.: PCT/EP2011/057208
§ 371 (c)(1),
(2), (4) Date: Feb. 2, 2013

(87) PCT Pub. No.: WO2011/138397
PCT Pub. Date: Nov. 10, 2011

(65) Prior Publication Data
US 2013/0131307 A1    May 23, 2013

(30) Foreign Application Priority Data

May 6, 2010  (EP) .................................. 10162132

(51) Int. Cl.
*C08G 69/26*    (2006.01)
*C08G 69/00*    (2006.01)
*C08L 77/06*    (2006.01)
*C08G 69/46*    (2006.01)
*C08G 69/28*    (2006.01)

(52) U.S. Cl.
CPC ............... *C08G 69/00* (2013.01); *C08G 69/26* (2013.01); *C08G 69/28* (2013.01); *C08G 69/46* (2013.01); *C08L 77/06* (2013.01)

(58) Field of Classification Search
CPC ........... C08L 77/06; C08G 69/26; C08G 69/46
See application file for complete search history.

(56) References Cited

U.S. PATENT DOCUMENTS 4,849,498 A * 7/1989 Roerdink et al. ............. 528/339
2011/0301290 A1  12/2011 Kato et al.

FOREIGN PATENT DOCUMENTS

| EP | 2 402 385 | 1/2012 |
| WO | WO 00/09586 | 2/2000 |
| WO | WO 00/56803 | 9/2000 |
| WO | WO 2010-098335 | 2/2010 |

OTHER PUBLICATIONS

International Search Report for PCT/EP2011/057208, mailed Jun. 28, 2011.
Written Opinion for PCT/EP2011/057208, mailed Jun. 28, 2011.
Kohan, Melvin I, *Nylon Plastic Handbook*, Hanser Publishers, 1995, Table of Contents and pp. 28-29.

* cited by examiner

*Primary Examiner* — Gregory Listvoyb
(74) *Attorney, Agent, or Firm* — Nixon & Vanderhye P.C.

(57) ABSTRACT

A process for preparation of a polyamide PA-4X containing monomer units of 1,4-diaminobutane and an aliphatic linear dicarboxylic acid X with at least 8 carbon atoms, which contains the following steps: 1) making a solution comprising a salt of 1,4-diaminobutane and the aliphatic linear dicarboxylic acid and water, at a temperature at which the salt dissolves; 2) concentrating the solution of the salt at a temperature above the crystallization temperature of the salt, at a pressure of at most 7 barA to a water content of between 0 and 30 wt % based on the total amount of solution, 3) producing a polymer from the solution obtained by step 2, while keeping the polymer in a melt and at a pressure of less than 18 barA, 4) depressurizing the polymer obtained at step 3 while keeping the polymer in the melt to further polymerize the polymer. In an preferred embodiment the aliphatic linear dicarboxylic acid is 1,10-decanedioic acid. Also claimed is a polyamide 410 having a viscosity number (VN) of at least 100 ml/gram.

18 Claims, No Drawings

PROCESS FOR PREPARING PA-4X, AND PA-410 OBTAINABLE BY THE PROCESS

This application is the U.S. national phase of International Application No. PCT/EP2011/057208 filed 5 May 2011 which designated the U.S. and claims priority to EP Patent Application No. 10162132.4 filed 6 May 2010, the entire contents of each of which are hereby incorporated by reference.

This invention relates to a process for preparation of a polyamide containing monomer units of 1,4-diaminobutane and an aliphatic linear dicarboxylic acid, as well as PA-410 obtainable by this process and products made there from. A polyamide containing monomer units of 1,4-diaminobutane and an aliphatic linear dicarboxylic acid is hereafter also referred to as PA-4X.

A method of preparation of PA-4X, wherein X is 1,10-decanedioic acid, also known as PA-410, is known and is for example described in WO 00/09586. This method produces the polymer in the final step by post condensation of a prepolymer in the solid state at about 25° C. below the melting point of the polymer.

A disadvantage of this method is that PA-410 is obtained with a low molecular weight. The value of a lot of properties increases with increasing molecular weight, such as for example mechanical properties, including strength, impact resistance and rheological properties, including melt strength.

It is thus an object of the present invention to provide a process for preparation of PA-4X, which yields a higher molecular weight.

This object has surprisingly been achieved by a process for preparation of a polyamide PA-4X containing monomer units of 1,4-diaminobutane and an aliphatic linear dicarboxylic acid X with at least 8 carbon atoms, which contains the following steps:
1) making a solution comprising a salt of 1,4-diaminobutane and the aliphatic linear dicarboxylic acid and water, at a temperature at which the salt dissolves;
2) concentrating the solution of the salt at a temperature above the crystallization temperature of the salt, at a pressure of at most 7 barA to a water content of between 0 and 30 wt % based on the total amount of solution,
3) producing a polymer from the solution obtained by step 2, while keeping the polymer in a melt and at a pressure of less than 18 barA,
4) depressurizing the polymer obtained at step 3 while keeping the polymer in the melt to further polymerize the polymer.

Surprisingly, with the process according to the invention, PA-4X is obtained with a higher molecular weight, as shown in the examples below.

Another advantage is that no extra step for a post condensation process is necessary to obtain the polymer with a higher molecular weight, which simplifies the process and makes the process faster.

Preferably, the process is carried out in an oxygen-low environment. An oxygen-low environment is here understood to be an environment which has less than 1000 ppm oxygen, preferably less than 500 ppm oxygen, more preferably less than 100 ppm oxygen.

Preferably the aliphatic linear dicarboxylic acid with at least 8 carbon atoms has at most 18 carbon atoms. More preferably the aliphatic linear dicarboxylic acid is chosen from the group of 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid and 1,18-octadecanedioic acid. Even more preferably the aliphatic linear dicarboxylic acid has an even number of carbon atoms, as this results in a relatively higher melting point of the polyamide. Most preferred, the aliphatic linear dicarboxylic acid is 1,10-decanedioic acid.

A similar method to the claimed method is known for example for the production of PA-610 and PA-66 and for example described in Nylon Plastics Handbook, M. I. Kohan, Hanser Publishers, 1995, pages 17-23. A disadvantage, however, is that when PA-4X is produced in a process analogous to the process for preparing for example PA-66 (see pages 20, 21 in Nylon Plastics Handbook, M. I. Kohan, Hanser Publishers, 1995), no polymer is obtained with a high molecular weight. Surprisingly, with the process as claimed, PA-4X with a high molecular weight can be obtained.

Step 1 is performed at a temperature at which the salt dissolves and preferably has an upper limit of 100° C. to allow operation at atmospheric pressure. Preferably this temperature is between 60 and 80° C.

The molar ratio of 1,4-diaminobutane and the aliphatic linear dicarboxylic acid with at least 8 carbon atoms is preferably around 1:1, more preferably the molar ratio is between 1:1 and 1.07:1. Most preferred, the molar ratio is between 1:1 and 1.04:1. More preferably, the molar ratio of 1,4-diaminobutane and 1,10-decanedioic acid is around 1:1, even more preferred the molar ratio is between 1:1 and 1.07:1 and most preferred between 1:1 and 1.04:1.

Preferably, the salt concentration in this step is between 30 and 70 wt %, more preferably between 40 to 60 wt %.

Step 2 is preferably performed at a pressure of at least 0.1 barA, more preferably at least 1 barA. Preferably, the pressure is at most 5 barA, more preferably, the pressure is at most 3 barA. Most preferred, the pressure is between 1.5 and 3 barA in step 2. The pressure is given in "barA" which refers to the absolute pressure. The advantage of these pressures at step 2 is that there is less risk of foam formation, which is unfavorable for a reactor, as well as less risk of crystallization of the salt solution. Crystallization as well as foaming are unwanted as these clog the reactor and require excessive cleaning. The temperature at step 2 must lie above the crystallization temperature of the salt. With the crystallization temperature of the salt it is meant the crystallization temperature of the salt in solution if there is still water present, or the crystallization temperature of the pure salt when no water is present. Preferably, the temperature is at most 190° C., more preferably at most 180° C., even more preferably at most 170° C. and most preferred at most 160° C.

Preferably, the water content at the end of step 2 is less than 25 wt %, more preferably less than 20 wt % and even more preferably less than 15 wt %. Most preferred, the water content is less than 10 wt %. It has been shown that it is favorable to have a low water content in the second step, because surprisingly a higher reactive pre-polymer is obtained, resulting in a higher molecular weight of the final polymer. Preferably, the water content is at least 0.01 wt %, more preferably at least 0.1 wt %, even more preferably at least 1 wt %, and most preferred at least 2 wt %.

Step 3 is carried out at a pressure of less than 18 barA, preferably less than 17 barA and more preferably less than 16 barA. For the aliphatic linear dicarboxylic acid being 1,10-decanedioic acid, the preferred pressure is preferably carried out at a pressure below 17 barA, more preferably the pressure is less than 16 barA, even more preferably less than 15 barA and most preferred less than 14 barA.

Preferably, the pressure of step 3 is less than 24−X barA, in which X has the value of the carbon atoms of the aliphatic linear dicarboxylic acid. For the aliphatic linear dicarboxylic acid being 1,10-decanedioic acid, the most preferred pressure is thus less than 24−10=14 barA.

The preferred pressure in step 3 for the aliphatic linear dicarboxylic acid being 1,10-decanedioic acid is at least 8 barA, more preferably the pressure is at least 10 barA, and even more preferred the pressure is at least 12 barA. Preferably, the pressure in step 3 is at least 22−X barA, in which X has the value of the carbon atoms of the aliphatic linear dicarboxylic acid. Most preferred the pressure is between 12 and 14 barA for the aliphatic linear dicarboxylic acid being 1,10-decanedioic acid. The pressure is regulated by controlled escape of water and raising the temperature.

Preferably, temperature and pressure are kept above the liquid freezing point of PA-4X. The liquid freezing point of PA-4X is here understood to be a certain pressure and temperature at which PA-4X is solidified, as described in "Nylon Plastics Handbook", Melvin I. Kohan, Hanser Publishers, 1995, page 18. Step 3 can also be carried out below the liquid freezing point of PA-4X, however, the time spent below the liquid freezing point has then to be relatively short, in order to keep PA-4X in the melt. Preferably, step 3 is continued until the temperature of the solution is above the melting temperature PA-4X minus 15° C., more preferably above the melting temperature of the polymer.

In step 4, the polymer is depressurized, while keeping the polymer in the melt to further polymerize the polymer.

The temperature of step 4 is preferably at least above the melting temperature of the polymer minus 15° C., which is around 233° C. for pure PA-410, as the melting temperature of PA-410 is 248° C. Melting temperatures can be measured by standard differential scanning calorimetry measurements (DSC) at 10° C. per minute.

Preferably, the pressure is released gradually, e.g. in steps of 0.2 bar per minute. This has the advantage that the temperature can be more easily controlled. After depressurizing the polymer, preferably the polymer is heated for at least 30 minutes at a temperature above the melting temperature of the polymer minus 15° C. to allow even further polymerization. More preferably, the temperature is above the melting temperature of the polymer and even more preferred the temperature is above 260° C. The higher the temperature is during this step, the shorter the time is needed to obtain a polymer with higher viscosity number.

The highest temperature at which step 4 may be performed is limited for technical reasons and will usually be at most 350° C.

After step 4, the obtained polymer may be strand granulated or under water granulated, as known in the prior art. The process according to the invention has as advantage that the granulation step can be performed immediately after formation of PA-4X, whereas in WO 00/09586, a polymer powder is obtained and granulates are only obtained after an extra step.

The obtained polymer may optionally be post-condensated to obtain even higher viscosity number. As vessel a tumble dryer may be used. The temperature may be between 180 and 220° C., preferably between 200 and 220° C. the post-condensation is suitably carried out in a nitrogen or nitrogen/water vapor atmosphere, containing preferably at least 10 wt. % of water vapor.

The post condensation step may be stopped by cooling down the granulate, when the desired polymerization degree has been obtained.

With the process according to the invention PA-4X with improved properties can be obtained. Preferably, PA-410 can be obtained with improved properties compared to PA-410 as obtained by a the process as described in WO 00/09586.

Therefore the invention also relates to PA-410 obtainable by the process according to the invention, wherein this polyamide has a viscosity number (VN) as measured according to ISO 307 (Fifth edition 2007 May 15) in a polymer solution in formic acid (c=0.005 g/mL) at 25° C., of at least 100 ml/gram. Preferably, VN is at least 105 ml/gram, more preferably at least 110 ml/gram, even more preferably at least 120 ml/gram, and most preferably at least 130 ml/gram. Good results are obtained at least to a VN of up to 260 ml/gram, more preferably up to 240 ml/gram.

The PA-410 obtainable with the process according to the invention can not only advantageously be produced very fast and if desired to a high degree of polymerization. Also the final polymer is still much higher reactive, than the known PA-410. It is for example very well possible to mix the polymer at a low degree of polymerization and consequently low viscosity with reinforcing fibers and after that mixing step increase the degree of polymerization of the polymer further. In this way in a fast running process a fiber reinforced PA-410 composition may be obtained, having very good mechanical properties. It is also very well possible to produce a shaped article comprising the polymer, for example a film, or a stock shape, and increase the degree of polymerization of the polymer after that by a further condensation step, below the melting point of the polymer. In this way a shaped article with very good mechanical properties may be obtained, while it is not possible to produce such an article directly form the polymer having the same high degree of polymerization, because of the high viscosity of such a polymer.

Therefore in a preferred embodiment the invention relates to PA-410 having $$([\text{acid end groups}]+[\text{amine end groups}])>b-a\cdot VN \qquad \text{form. I,}$$

whereby [acid end groups] is the concentration of acid end groups in the polymer in meq/kg, and [amine end groups] is the concentration of amine end groups in the polymer in meq/kg, a is equal to 0.77, b is equal to 160 and VN is viscosity number in ml/gram. 1 meq is equal to $10^{-3}$ mol.

Preferably b is equal to 165, more preferably b is equal to 170.

Preferably form. I is applicable, however with the proviso that ([acid end groups]+[amine end groups])>20 meq/kg, more preferably >30 meq/kg, even more preferably >30 meq/kg. This results in an even further increase in post-condensation rate, obtained viscosity number and reactivity of the final polymer.

The PA-410 according to the invention may contain next to monomer units of butane 1,4-diamine and 1,10-decanedioic acid co-monomer units of further di-amines and/or di-acids and/or aminoacids. Preferably the PA-410 contains less than 20 wt. % of co-monomer units, more preferably less than 10 wt. %, more preferably less than 2 wt. %, most preferably less than 0.1 wt. %.

The PA-410 according to the invention may be compounded with reinforcing agents, like for example glass fibers, carbon fibers, whiskers etc and further usual additives.

The invention also relates to shaped articles comprising PA-4X of the present invention, preferably the shaped articles comprise PA-410. The PA-410 according to the present invention is especially suitable for producing shaped articles by an extrusion process, for example a blow molding process and a process of film extrusion. This is because for shaped articles produced by an extrusion process the higher viscosity number of the PA-410 according to the invention and the resulting better mechanical properties are extra beneficial.

The invention will now be elucidated with the following examples, without wishing to be limited thereto.

EXAMPLES

Compounds used:
1,4-diaminobutane, delivered by DSM, the Netherlands.
1,8-octanedioic acid (suberic acid) was obtained from Alfa Aesar
1,10-decanedioic acid, delivered by Dong Feng from China.
1,12-dodecanedioic acid was obtained from Merck Schuchardt OHG Measurements
Viscosity number (VN).

The viscosity number was determined according to ISO 307 Fifth edition 2007 May 15 by dissolving the PA-4X samples in formic acid (c=0.005 g/mL) at 25° C. and measuring of the viscosity number with the aid of an Ubelohde viscometer (Scott type 530-10/1), with the relationship between viscosity number and relative viscosity being VN=200*(relative viscosity−1).

End groups.

The carboxyl end groups were potentiometrically determined in o-cresol by means of a titration with tetrabutyl ammonium hydroxide.

The amino end groups were potentiometrically determined in phenol by means of a titration with hydrochloric acid.

Example 1

PA-48

Step 1. Salt Solution Preparation.

In an inert 2 L autoclave reactor a 45% 48-salt solution was prepared with a 1,4-diaminobutane excess of 0.5% based on the total weight of the 48-salt. At 65° C. 254.3 ml of a 67.1% 1,4-diaminobutane solution was added to 440 ml of water prior to adding 332 g of solid suberic acid.

Step 2. Concentrating the Salt Solution.

The maximum pressure of the reactor was set to 2 barA. The salt solution was heated up to 153° C. in 60 minutes. During this process the excess of water was distilled off until a salt concentration of 92% was reached at 160° C.

Step 3. Heating Up to the Melting Temperature.

The pressure of the reactor was set at 14 barA. The 48-salt solution was heated up in 15 minutes to reach a pressure of 14 barA. While maintaining 15 barA, more water is distilled off until the polymer melt temperature reached 265° C. In this phase the polymerization starts.

Step 4. Depressurizing the Polymer Melt.

At 265° C., the reactor was depressurized to 1.02 barA while heating up to 280° C. in 60 minutes.

Step 5. Polycondensation Phase.

The polymer melt was kept at 280° C. and 1.02 barA for 6 hours. The water of the polymer melt was stripped off with a small nitrogen flow.

Step 6. Granulation.

After the polycondensation phase the reactor was emptied into a water bath to get a polymer strand, which was off-line cut into granules. The PA-48 polymer had a solution viscosity of 108 ml/g in 90% formic acid, 55 meq $CO_2H$/kg and <5 meq $NH_2$/kg.

Example 2

PA-410

Step 1.

In an inert 2 L autoclave reactor a 45% 410-salt solution was prepared with a 1,4-diaminobutane excess of 0.7 wt % based on the total weight of the 410-salt. At 65° C. 230 ml of a 67.5% 1,4-diaminobutane solution (i.e. 0.675 kg 1,4-diaminobutane per 1 kg 1,4-diaminobutane solution) was added to 540 ml water prior to adding 348.2 g of solid 1,10-decanedioic acid.

Step 2.

The maximum pressure of the reactor was set to 2 barA. The salt solution was heated up to 153° C. in 60 minutes. During this process the excess of water was distilled off until a water concentration of 10% was reached at 153° C.

Step 3.

The pressure of the reactor was set at 12 barA. The 410-salt solution was heated up in 15 minutes to reach a pressure of 12 barA thereby polymerizing the salt solution. While maintaining 12 barA, more water is distilled off until a polymer melt was obtained and the temperature reached 250° C.

Step 4.

At 250° C., the reactor was depressurized to 1.02 barA while heating up to 265° C. in 60 minutes, while further polymerizing the polymer melt. The polymer melt was kept at 265° C. and 1.02 barA for 3 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 104 ml/g in 90% formic acid, 43 meq $CO_2H$/kg and 45 meq $NH_2$/kg. These figures are presented in table 1.

Step 6.

Postcondensation in the solid state for 96 hours at 220° C. with dry nitrogen yielded a VN of 225 ml/g, 10 meq $CO_2H$/kg and 20 meq $NH_2$/kg and these figures are presented in table 1.

Example 3

PA-410

Step 1.

In an inert 2 L autoclave reactor a 45% 410-salt solution was prepared with a 1,4-diaminobutane excess of 0.7 wt % based on the total weight of the 410-salt. At 65° C. 230 ml of a 67.5% 1,4-diaminobutane solution was added to 540 ml of water prior to adding 348.2 g of solid 1,10-decanedioic acid.

Step 2.

The maximum pressure of the reactor was set to 2 barA. The salt solution was heated up to 153° C. in 60 minutes. During this process the excess of water was distilled off until a water concentration of 8% was reached at 157° C.

Step 3.

The pressure of the reactor was set at 12 barA. The 410-salt solution was heated up in 15 minutes to reach a pressure of 12 barA, thereby polymerizing the salt solution. While maintaining 12 barA, more water is distilled off until a polymer melt was obtained and the temperature reached 250° C.

Step 4.

At 250° C., the reactor was depressurized to 1.02 barA while heating up to 280° C. in 60 minutes, while further polymerizing the polymer melt. The polymer melt was kept at 280° C. and 1.02 barA for 6 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 143 ml/g in 90% formic acid, <5 meq $CO_2H$/kg and 78 meq $NH_2$/kg and these figures are presented in table 1.

Example 4

PA-410

Step 1.

In an inert 2 L autoclave reactor a 45% 410-salt solution was prepared with a 1,4-diaminobutane excess of 0.7 wt % based on the total weight of the 410-salt. At 65° C. 230 ml of a 67.5% 1,4-diaminobutane solution was added to 540 ml of water prior to adding 348.2 g of solid 1,10-decanedioic acid.

Step 2.

The maximum pressure of the reactor was set to 2 barA. The salt solution was heated up to 153° C. in 60 minutes. During this process the excess of water was distilled off until a water concentration of 10% was reached at 153° C.

Step 3.

The pressure of the reactor was set at 12 barA. The 410-salt solution was heated up in 15 minutes to reach a pressure of 12 barA, thereby polymerizing the salt solution. While maintaining 12 barA, more water is distilled off until a polymer melt was obtained and the temperature reached 250° C.

Step 4.

At 250° C., the reactor was depressurized to 1.02 barA while heating up to 265° C. in 60 minutes, while further polymerizing the polymer melt. The polymer melt was further heated to 290° C. and kept at that temperature and 1.02 barA for 19 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 208 ml/g in 90% formic acid, 8 meq $CO_2H$/kg and 16 meq $NH_2$/kg and these figures are presented in table 1.

Example 5

PA-410

Step 1.

In an inert 2 L autoclave reactor a 45% 410-salt solution was prepared with a 1,4-diaminobutane excess of 0.5 wt % based on the total weight of the 410-salt. At 65° C. 228.5 ml of a 67.5% 1,4-diaminobutane solution was added to 540 ml of water prior to adding 348.2 g of solid 1,10-decanedioic acid.

Step 2.

The maximum pressure of the reactor was set to 2 barA. The salt solution was heated up to 157° C. in 60 minutes. During this process the excess of water was distilled off until a water concentration of 8% was reached at 157° C.

Step 3.

The reactor was closed. The 410-salt solution was heated up in 13 minutes to 202° C. and remained at 202° C. for 29 minutes reaching 16 barA, thereby polymerizing the salt solution into a polymer melt.

Step 4.

At 202° C., the reactor was depressurized to 1.02 barA while heating up to 275° C. in 25 minutes, while further polymerizing the polymer melt. The polymer melt was further heated to 290° C. and 1.02 barA and kept at that temperature for 5 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 154 ml/g in 90% formic acid, <5 meq $CO_2H$/kg and 59 meq $NH_2$/kg and these figures are presented in table 1.

A sample taken after 2 hours in step 4 had a solution viscosity of 107 ml/g in 90% formic acid. These figures are presented in table 1.

Example 6

PA-410

Step 1.

In an inert 2 L autoclave reactor a 45% 410-salt solution was prepared with a 1,4-diaminobutane excess of 0.5 wt % based on the total weight of the 410-salt. At 65° C. 228.5 ml of a 67.5% 1,4-diaminobutane solution was added to 540 ml of water prior to adding 348.2 g of solid 1,10-decanedioic acid.

Step 2.

The maximum pressure of the reactor was set to 2 barA. The salt solution was heated up to 157° C. in 60 minutes. During this process the excess of water was distilled off until a water concentration of 8% was reached at 157° C.

Step 3.

The 410-salt solution was heated up in 25 minutes to 290° C., thereby polymerizing the salt solution into a polymer melt. During this heating phase, the valve of the reactor was opened for 50% to distil water off. The maximum pressure reached was 7 barA at the end a pressure of 1.02 barA was maintained.

Step 4.

The polymer melt was kept at 290° C. and 1.02 barA and kept at that temperature for 4 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 145 ml/g in 90% formic acid, 53 meq $CO_2H$/kg and 8 meq NH$_2$/kg. A sample taken after 2 hours in step 4 had a solution viscosity of 135 ml/g in 90% formic acid. These figures are presented in table 1.

Example 7

PA-412

Step 1. Salt Solution Preparation.

In an inert 2 L autoclave reactor a 45% 412-salt solution was prepared with a 1,4-diaminobutane excess of 0.5% based on the total weight of the 412-salt. At 80° C. 210 ml of a 67.1% 1,4-diaminobutane solution was added to 470 ml of water prior to adding 361.6 g of solid 1,12-dodecandedioic acid.

Step 2. Concentrating the Salt Solution.

The maximum pressure of the reactor was set to 2 barA. The salt solution was heated up to 153° C. in 60 minutes. During this process the excess of water was distilled off until a salt concentration of 92% was reached at 156° C.

Step 3. Heating Up to the melting temperature.

The pressure of the reactor was set at 10 barA. The 412-salt solution was heated up in 15 minutes to reach a pressure of 10 barA. While maintaining 10 barA, more water is distilled off until the polymer melt temperature reached 250° C. In this phase the polymerization starts.

Step 4. Depressurizing the Polymer Melt.

At 250° C., the reactor was depressurized to 1.02 barA while heating up to 280° C. in 60 minutes.

Step 5. Polycondensation Phase.

The polymer melt was kept at 280° C. and 1.02 barA for 6 hours. The water of the polymer melt was stripped off with a small nitrogen flow.

Step 6. Granulation.

After the polycondensation phase the reactor was emptied into a water bath to get a polymer strand, which was off-line cut into granules. The PA-412 polymer had a solution viscosity of 102 ml/g in 90% formic acid, <12 meq CO$_2$H/kg and 96 meq NH$_2$/kg.

Comparative Experiment A

Step 1.

An inert 2 L autoclave reactor a 45% 410-salt solution was prepared with a 1,4-diaminobutane excess of 0.7 wt % based on the total weight of the 410-salt. At 65° C. 230 ml of a 70% 1,4-diaminobutane solution was added to 540 ml water prior to adding 348.2 g of solid 1,10-decanedioic acid.

Step 2.

The maximum pressure of the reactor was set to 4.5 barA. The salt solution was heated up to 157° C. in 60 minutes. During this process the excess of water was distilled off until a water concentration of 30% was reached at 157° C.

Step 3.

The pressure of the reactor was set at 18 barA. The 410-salt solution was heated up in 30 minutes to reach a pressure of 18 barA thereby polymerizing the salt solution. While maintaining 18 barA, more water is distilled off until a polymer melt was obtained and the temperature reached 250° C.

Step 4.

At 250° C., the reactor was depressurized to 1.02 barA while heating up to 270° C. in 60 minutes, while further polymerizing the polymer melt. The polymer melt was kept at 265° C. and 1.02 barA for 2 hours. The water of the polymer melt was stripped off with a small nitrogen flow.

Step 5.

After the polycondensation phase the reactor was emptied into a water bath to get a polymer strand, which was off-line cut into granules. The PA-410 polymer had a solution viscosity of 40 ml/g in 90% formic acid, 205 meq CO$_2$H/kg and 12 meq NH$_2$/kg and these figures are presented in table 1.

Comparative Experiment B

Preparation of PA-410, According to Example 1 of WO00/09586

350 grams of 1.10-decanedoiic acid, 157 grams of butane-1,4-diamine and 420 grams of water are stirred in an autoclave for 30 minutes at 90° C. to obtain a solution of the salt of the diamine and the acid in a concentration of 55 wt. % in water. Than water is removed by first raising the temperature in 10 minutes to 180° C., removing about half of the amount of water under distillation and than raising the temperature to 200° C. and further removing water through distillation, to obtain a concentrated solution containing 10 wt. % of water. Than the autoclave is closed and the temperature in the autoclave is raised until 227° C. The pre-polymerisation is performed during 30 minutes at the same temperature, after which the content of the autoclave is flashed in a nitrogen atmosphere and the prepolymer was granulated and cooled.

The granules of the pre-polymer were placed in a tumble dried and post-condensed at a temperature of 220° C. in a nitrogen/water vapor atmosphere (75/25 wt. %) for 24 hours. Samples were taken after before and during the post-condensation. Viscosity number was measured and reported in table 1.

TABLE 1 viscosity number and end group concentration

| | PA4X | VN (ml/gram) | NH$_2$ (meq/kg) | CO$_2$H (meq/kg) | NH$_2$ + CO$_2$H |
|---|---|---|---|---|---|
| Example 1 | PA-48 | 108 | <5 | 55 | 55-60 |
| Example 2 | PA-410 | 104 | 45 | 43 | 88 |
| Example 2 after step 6 | PA-410 | 225 | 20 | 10 | 30 |
| Example 3 | PA-410 | 143 | 78 | <5 | 78-83 |
| Example 4 | PA-410 | 208 | 16 | 8 | 24 |
| Example 5 | PA-410 | 154 | 59 | <5 | 59-64 |
| Example 5 (2 hours) | PA-410 | 107 | | | |
| Example 6 | PA-410 | 145 | 8 | 53 | 61 |
| Example 6 (2 hours) | PA-410 | 135 | | | |
| Example 7 | PA-412 | 102 | 96 | <12 | 96-108 |
| Comp. Ex. A | PA-410 | 40 | 12 | 205 | 217 |
| Comp. Ex. B | PA-410 | 92 | 7 | 87 | 94 |

From Table 1 it is clear that with the process according to the invention PA-4X is obtained with higher viscosity number than in the comparative examples. Examples 2 to 6 show that polyamide 4,10 is obtained with higher viscosity number than in the comparative examples. It is also shown that after a relative short time of polymerizing in step 4 (only 2 hours, in Example 5 and 6) already a higher viscosity number could be obtained.

Comparative example A reflects a method for production wherein in step 3 a high pressure (18 barA) was employed, which is a typical pressure for the production of PA66. This comparative example resulted in low viscosity. Comparative example B reflects the method of production as disclosed in WO 00/09586, which clearly shows that only low viscosity could be obtained.

The invention claimed is:

1. A process for preparation of a polyamide PA-4X containing monomer units of 1,4-diaminobutane and an aliphatic linear dicarboxylic acid X with at least 8 carbon atoms, wherein the process comprises the following steps:
   (1) making an aqueous solution comprising a salt of 1,4-diaminobutane and the aliphatic linear dicarboxylic acid and water, at a temperature at which the salt dissolves;
   (2) concentrating the solution of the salt at a temperature above the crystallization temperature of the salt, at a pressure of at most 7 barA to a water content of between 0 and 30 wt % based on the total amount of aqueous solution,
   (3) producing a polymer from the aqueous solution obtained by step (2), while keeping the polymer in a melt by controlling escape of water from the aqueous solution and by maintaining an increased pressure of at least 8 barA to less than 18 barA and an increased temperature which are sufficient to thereby obtain polymerization conditions above a liquid freezing point of the polymer to achieve a viscosity number (VN) of the polymer as measured according to ISO307, fifth edition 2007 May 15 in formic acid (c=0.005 g/mL) at 25° C. which is at least 100 ml/gram,
   (4) depressurizing the polymer having a VN of at least 100 ml/gram obtained in step (3) while keeping the polymer in the melt to further polymerize the polymer; and
   (5) without an intervening step immediately following step (4), subjecting the polymer to strand or underwater granulating.

2. The process according to claim 1, in which the aliphatic linear dicarboxylic acid is chosen from the group of 1,8-octanedioic acid, 1,9-nonanedioic acid, 1,10-decanedioic acid, 1,11-undecandioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid and 1,18-octadecanedioic acid.

3. The process according to claim 1, in which X is 1,10-decanedioic acid.

4. The process according to claim 1, wherein the water content in step (2) is less than 15 wt %, based on the total amount of the solution.

5. The process according to claim 1, wherein the water content in step (2) is less than 10 wt %, based on the total amount of the solution.

6. The process according to claim 1, wherein the pressure in step (3) is less than 24-X barA, in which X has a value of the number of carbon atoms in the aliphatic linear dicarboxylic acid.

7. The process according to claim 1, wherein the pressure in step (3) is between 22-X barA and 24-X barA, in which X has a value of the number of carbon atoms in the aliphatic linear dicarboxylic acid.

8. The process according to claim 1, wherein the temperature in step (4) is at least 233° C. and the aliphatic linear dicarboxylic acid is 1,10-decanedioic acid.

9. A polyamide 410 obtained by the process according to claim 1, wherein the polyamide 410 has a viscosity number (VN) as measured according to ISO307, fifth edition 2007 May 15 in formic acid (c=0.005 g/mL) at 25° C., of at least 105 ml/gram.

10. The polyamide 410 according to claim 9, wherein the viscosity number (VN) is at least 110 ml/gram.

11. The polyamide 410 according to claim 9, wherein the polyamide 410 satisfies formulae (I):

$$([\text{acid end groups}]+[\text{amine end groups}]) > b - a \cdot VN \quad (I),$$

wherein:
[acid end groups] is the concentration of acid end groups in the polyamide 410 in meq/kg,
[amine end groups] is the concentration of amine end groups in the polyamide 410 in meq/kg,
a is equal to 0.77,
b is equal to 160, and
VN is the viscosity number in ml/gram.

12. The polyamide 410 according to claim 11, wherein b is equal to 165.

13. The polyamide 410 according to claim 11, wherein formulae I is applicable with the proviso that:

[acid end groups]+[amine end groups]>20 meq/kg.

14. The polyamide 410 according to claim 9, wherein the viscosity number (VN) is at least 120 ml/gram.

15. The polyamide 410 according to claim 9, wherein the viscosity number (VN) is at least 130 ml/gram.

16. The polyamide 410 according to claim 9, wherein the viscosity number (VN) is 105 ml/gram up to 260 ml/gram.

17. The polyamide 410 according to claim 9, wherein the viscosity number (VN) is 105 ml/gram up to 240 ml/gram.

18. A shaped article, comprising the polyamide 410 according to claim 9.

* * * * *